United States Patent

[11] 3,550,570

| [72] | Inventor | Hal Watson, Jr.<br>Dallas, Tex. |
|---|---|---|
| [21] | Appl. No. | 757,653 |
| [22] | Filed | Sept. 5, 1968 |
| [45] | Patented | Dec. 29, 1970 |
| [73] | Assignee | Harry M. Reid<br>Dallas, Tex. |

[54] FLOW CONTROL SYSTEM
3 Claims, 5 Drawing Figs.

| [52] | U.S. Cl. | 123/119 |
|---|---|---|
| [51] | Int. Cl. | F02f 9/00,<br>F02m 25/06 |
| [50] | Field of Search | 123/119A,<br>119B, 119D, 119D2; 137/455, 480, 484.2, 505.22,<br>(Inquired) |

[56] References Cited
UNITED STATES PATENTS

| 1,271,541 | 7/1918 | Core et al. | 123/119 |
| 2,139,801 | 12/1938 | Boyce | 123/119 |
| 3,172,348 | 3/1965 | Berg | 123/119 |
| 3,176,670 | 4/1965 | Sinibaldi | 123/119 |
| 3,287,899 | 11/1966 | Bintz | 123/119 |

FOREIGN PATENTS

| 756,378 | 9/1956 | Great Britain | 123/119 |

*Primary Examiner*—Wendell E. Burns
*Attorney*—Richards, Harris & Hubbard

ABSTRACT: A flow-control valve is provided which is adapted to regulate the flow of a fluid such as air passing therethrough in response to a control vacuum pressure. This control valve is particularly adapted to act in combination with a positive crankcase ventilation system for an internal combustion engine to admix varying amounts of air, in response to intake manifold pressure, with the "blowby" gases removed from the engine's crankcase, to thereby form mixtures of air with these "blowby" gases which are injected into the engine's intake manifold.

INVENTOR

HAL WATSON, JR.

Richards, Harris & Hubbard

ATTORNEYS

INVENTOR

HAL WATSON, JR

Richards, Harris & Hubbard

ATTORNEYS

FLOW CONTROL SYSTEM

BRIEF SUMMARY OF THE INVENTION

This invention relates to valve mechanisms. In another aspect, this invention relates to valve mechanism adapted to control fluid flow in response to a control vacuum pressure. In still another aspect, this invention relates to a system of adding controlled amounts of air in response to the intake manifold pressure of an internal combustion engine to a stream of vaporous constituents which is removed from the engine's crankcase via a positive crankcase ventilation system and passed into the intake manifold of the engine.

Various products of combustion which are produced by internal combustion engines include carbon dioxide, carbon monoxide, uncombusted and partially combusted hydrocarbons, oxides of nitrogen and sulfur, and water. The emission of these constituents into the atmosphere by automobiles has contributed greatly to the high levels of air pollution, especially in metropolitan areas. One major source of this emission has been caused by the so-called "blowby" gases. "Blowby" gases are comprise some of the above-mentioned constituents which are forced past the pistons and rings into the crankcase of an internal combustion engine. These "blowby" gases are mixed with oil vapors containing tars, varnishes, gums, and sludge which are produced in the crankcase along with fine particles of oil to form a mixture which has traditionally been vented from the crankcase into the atmosphere.

In an attempt to reduce air pollution caused by the emission of these constituents from the crankcase of automobiles, recent legislation has been enacted requiring the passage of these vapors from the crankcase into the engine's fuel-intake system. This provides generally for a conduit having a positive crankcase ventilation valve disposed therein and communicating between the upper region of the engine's crankcase (above the oil level) and the engine's fuel-intake system. The positive crankcase ventilation valve is merely a check valve which allows vapors to flow only in one direction, i.e., from the crankcase into the fuel-intake system. This allows for any uncombusted constituents to be recharged into the engine and completely combusted.

Various problems have resulted when using this positive crankcase ventilation system. Such problems include the deposit of tars and sludge into the engine's carburetor and/or manifold, and upper valve systems. This particular problem has been remedied by placing a filtering device in the positive crankcase ventilation line to remove the heavier tars, varnishes and sludges from the vapor stream. Also, conventional carburetion equipment is not adapted to effectively mix the additional vaporous combustible products with air to provide a highly efficient combustible mixture. Therefore, much of the recirculated mixture is removed from the engine's exhaust system in the uncombusted or partially combusted state. Thus, there is needed a system for introducing controlled amounts of air into this vaporous stream to provide for not only more efficient combustion of these vaporous constituents, but increased mileage per unit of fuel.

Therefore, one object of this invention is to provide a novel valve system.

Another object of this invention is to provide a novel valve system which will introduce controlled amounts of air into a vaporous steam containing "blowby" gases which is passed from the crankcase to the fuel-intake system of an internal combustion engine.

According to one embodiment of this invention, a valve mechanism is provided which will allow controlled amounts of a fluid such as air to pass therethrough in response to a control vacuum pressure.

According to another embodiment of this invention, the above-described valve is connected to an internal combustion engine between the positive crankcase ventilation valve, the air cleaner, and the intake manifold. Air is passed from the air cleaner through the valve in response to the pressure within the intake manifold. The air passing from the valve is admixed with vapor from the positive crankcase ventilation valve and passed into the intake manifold.

This invention can be more easily understood from a study of the drawings in which.

Figure 1:
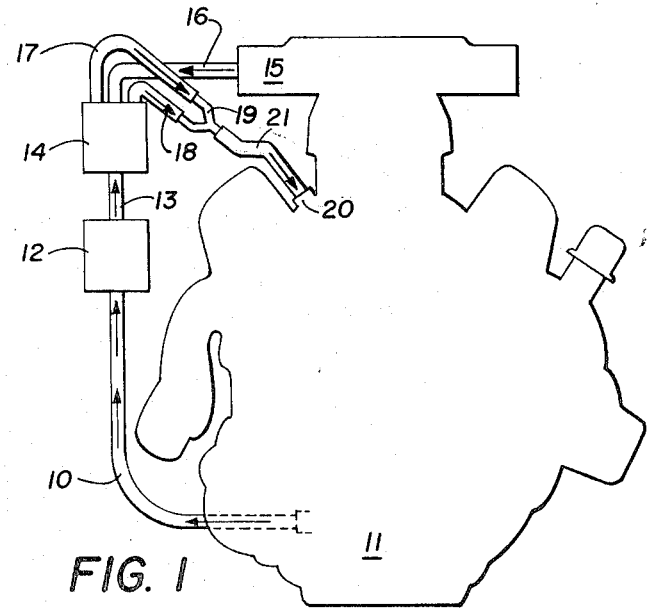
FIG. 1 is a schematic view generally illustrating the connection between the valve mechanism of this invention and an internal combustion engine.

Now referring to FIG. 1, the external connection between the valve mechanism of this invention and an internal combustion engine is schematically illustrated. Crankcase ventilation conduit 10 communicates between the upper region of oil pan 11 and filter 12. Conduit 13 communicates between filter 12 and valve housing 14. Valve housing 14 is connected to air cleaner 15 by air conduit 16. Vacuum line 17 and feed line 18 are interconnected between valve housing 14 and y-coupling means 19. Y-coupling means 19 is connected to intake manifold 20 by conduit 21.

According to the general operation of the system, "blowby" gases which are mixed with oil vapors and droplets are removed from the upper region of oil pan 11 via conduit means 10 and passed through filtering unit 12. Filter 12 will retain the viscous tars, varnishes, gums and sludge and allow the more vaporous nonviscous combustible constituents to pass therethrough. This vapor stream is passed to valve housing 14 via conduit 13. Air from air cleaner 15 is passed into valve housing 14 via conduit 16. The valve mechanism within valve housing 14 will cause a controlled amount of this air to be admixed with the stream of vapor constituents to form an air mixture which is passed into intake manifold 20 via conduit 18, Y-coupling 19, and conduit 21.

Figure 2:
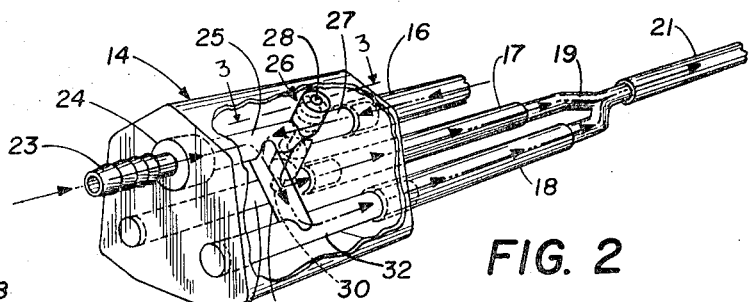
FIG. 2 is a perspective view partly in section illustrating a preferred embodiment of this invention.

Now referring to FIG. 2, the valving mechanism within valve housing 14 will be described. Hose coupling 23 is connected to positive crankcase ventilation check valve 24 which can be any suitable one-way valve mechanism known in the art. Conduit 25 communicates between air control valve 26 and positive crankcase ventilation check valve 24. Conduit 27 connects valve 26 with conduit 16. The upper region of air control valve 26 is vented to the atmosphere by conduit 28. The lower region of valve 26 is connected to conduit 29 by conduit 30. Conduit 29 is connected to vacuum line 17. Conduit 31 communicated communicates with conduit 25 at a point between positive crankcase ventilation valve 24 and valve 26. Conduit 31 is also connected to conduit 32 which in turn is connected to feed line 18. The ends of conduits 29 and 32 adjacent connection 23 are plugged, but extend through housing 14 merely to support the conduits within the housing.

Figure 3:
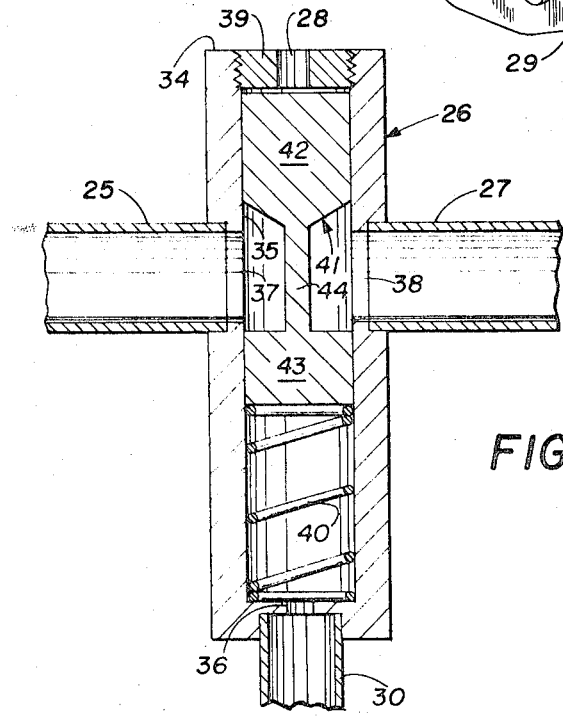
FIG. 3 is a sectional view along lines 3–3 of FIG. 2 illustrating a valve mechanism of this invention in the fully open position.

Now referring to FIG. 3, air control valve 26 will be described in greater detail. The body of air control valve 26 comprises an enclosed cylindrical body 34 having a smooth piston bore 35 disposed axially therethrough. Annulus 36 communicates between the lower region of piston bore 35 and the conduit 30. Annulus 37 communicates between an intermediate region of piston bore 35 and conduit 25, and annulus 38 communicates between conduit 27 and an intermediate region of piston bore 35 adjacent annulus 37. Plug 39 is threadably engaged at the upper region of the piston chamber and carries air vent conduit 28 therethrough. Coil spring 40 is positioned in the lower region of the piston chamber and thereby supports piston 41. Piston 41 comprises an upper piston body 42 connected to a lower piston body 43 by piston rod 44. As shown in the drawings, piston rod 44 generally comprises a section of reduced diameter of the cylindrical piston body.

Valve 26 functions to introduce controlled amounts of air into the vaporous hydrocarbon constituents passing into conduit 25 as a function of the engine's intake manifold pressure. This action will not only provide for a more efficient engine operation and greater gasoline mileage when the automobile is functioning at cruising speeds, but will prevent the unwanted burning and charring of the valves when the engine is operating at the lower speeds and is idling. When the engine is idling and operating a very low speed, the butterfly valves in the carburetor constrict the opening from the carburetor into the intake manifold, and thereby allow very little vapor to pass therethrough. This, in turn, results in an increased vacuum within the intake manifold. It has been found that if a highly oxygenated fuel mixture is introduced into the intake manifold under these conditions, it will readily combust and thereby cause unwanted burning and pitting of the valves. On the other hand, when the engine is operating at the higher speeds, the butterfly valves in the carburetor are opened, and the vacuum within the intake manifold is correspondingly reduced, and there is, of course, no danger of burning the valves when a highly oxygenated fuel is passed into the intake manifold. Therefore, at the higher speeds, when the pressure within the intake manifold becomes much greater, and even increases to atmospheric pressure, it is desirable that any additional fuel injected directly into the intake manifold also contain sufficient oxygen to cause the complete combustion thereof because the fuel passing into the intake manifold through the carburetor contains sufficient air only for its combustion. As will be described below, the valve of this invention will function to introduce the proper amount of air into "blowby" gases introduced into the engine's intake manifold during all phases of engine operation.

Figure 4:
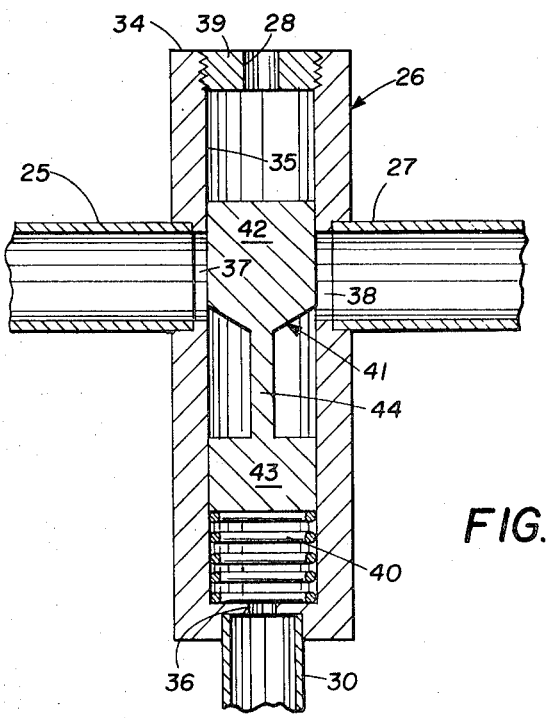
FIGS. 4 and 5 show the valve mechanism of FIG. 3 in other operating positions.
Figure 5:
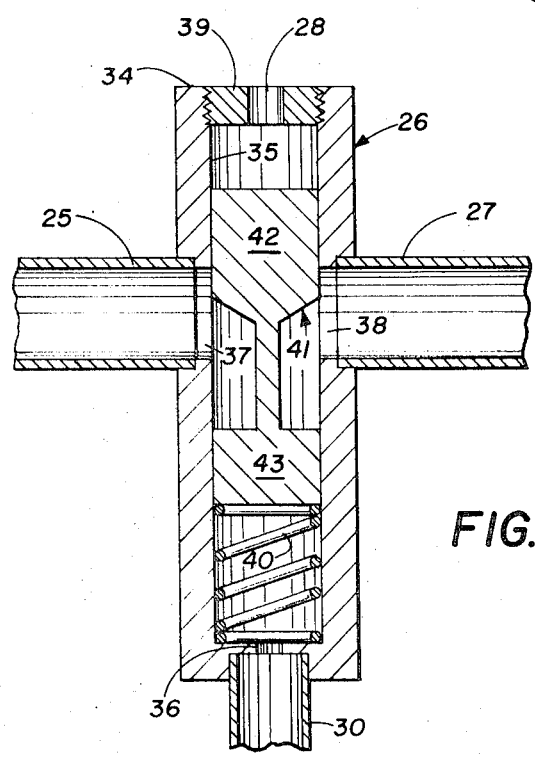

Now referring to FIG. 2 in relation to FIGS. 3—5, the operation of the valve of this invention will be described in detail. As described above, when the engine is idling, the pressure within the intake manifold will be very low. This, in turn, will cause a suction through lines 21 and 17, thereby causing a vacuum such as, for example, 20 inches of mercury, within the piston chamber containing spring 40. The action of this vacuum plus the atmospheric pressure on the face of upper piston body 42 of piston 41 will cause piston 41 to drop to the position as illustrated in FIG. 4. As show shown, the valve in FIG. 4 is about 10 percent open. This, in turn, will reduce the flow of air from conduit 16 through valve 26 into conduit 25. Thus, the air hydrocarbon mixture which forms in conduit 31 and is subsequently passed into the intake manifold via conduits 18 and 21 will contain relatively little oxygen.

As the engine speed is increased and the automobile begins to cruise, the pressure within the intake manifold and within the vacuum chamber containing spring 40 will increase. Under these conditions, spring 40 will force piston 41 into the position as illustrated in FIG. 5. Generally, at cruising speeds, it is preferred that the air control valve 26 be from 60 percent —70 percent open. As the engine speed is increased even more, such as during passing, the pressure within the intake manifold and within the vacuum chamber containing spring 40 will correspondingly increase, thereby causing spring 40 to push piston 41 even higher within piston bore 35. FIG. 3 illustrates the position of the valve when the pressure within the intake manifold is equal to the atmospheric. Under these conditions, the maximum airflow will pass through the valve 26 into conduit 25 to admix with the vaporous constituents.

While this invention has been described in reference to its preferred embodiments, it must be noted that many modifications and variations will now be apparent to those skilled in the art. For example, while piston 41 has been described as a cylindrical body having upper and lower piston bodies 42 and 43, respectively, with its midsection being of reduced diameter to form piston rod 44, it is easily understood that piston 41 can be of any convenient shape, and carry various types of airpervious regions adjacent its midsection, for example, at least one annulus. Additionally, it will be quite apparent to those skilled in the art that the relative size of fluid flow passages through valve 26 and the compressive strength of spring 40 can vary with the particular application.

I claim:
1. A control valve comprising:
   a. an enclosed, elongated tubular body having a first end and a second end connected by an axial piston bore;
   b. first and second conduit means communicating with the interior of said tubular body adjacent the midsection thereof;
   c. third conduit means communicating with the interior of said tubular body adjacent the first end thereof;
   d. fourth conduit means communicating with the interior of said tubular body adjacent the second end thereof;
   e. a piston body slidably disposed within said piston bore thereby separating said bore into a vacuum chamber adjacent the first end of said tubular body and a pressure chamber adjacent the second end of said tubular body, said piston body having a fluid permeable region adjacent its midsection;
   f. a spring means disposed within said tubular body to thereby force said piston body towards said second end of said tubular body and said fluid permeable zone in communication with said first and second conduits;
   g. fifth conduit means communicating between said first conduit means and an air source;
   h. sixth conduit means communicating between said third conduit means and the intake manifold of an internal combustion engine;
   i. seventh conduit means communicating between said second conduit means and said intake manifold; and
   j. eighth conduit means communicating between said seventh conduit means and the oil pan of said internal combustion engine for conducting vaporous material therethrough.

2. The control valve of claim 1 wherein said fifth conduit means is connected to a carburetor air cleaner of said internal combustion engine.

3. The control valve of claim 1 wherein said eighth conduit means contains a filter means and a check valve means operatively connected therein in series between said oil pan and said seventh conduit means.